2 Sheets—Sheet 1.

C. A. GRISWOLD.

CORSET.

No. 10,935. Reissued June 5, 1888.

WITNESSES:

C. W. Benjamin.

H. T. Fales

INVENTOR.

Catharine A. Griswold.

BY Orden S. Fitch

Her ATTORNEY.

N. PETERS, Photo-Lithographer, Washington, D. C.

C. A. GRISWOLD.

CORSET.

No. 10,935. Reissued June 5, 1888.

WITNESSES:

C. W. Benjamin.

A. T. Fales

INVENTOR,

Catharine A. Griswold

BY Arden S. Fitch.

Her ATTORNEY.

N. PETERS, Photo-Lithographer, Washington, D. C.

UNITED STATES PATENT OFFICE.

CATHARINE A. GRISWOLD, OF NEW YORK, N. Y.

CORSET.

SPECIFICATION forming part of Reissued Letters Patent No. 10,935, dated June 5, 1888.

Original No. 358,349, dated February 22, 1887. Application for reissue filed December 30, 1887. Serial No. 259,405.

*To all whom it may concern:*

Be it known that I, CATHARINE A. GRISWOLD, of the city, county, and State of New York, and a citizen of the United States, have invented certain new and useful Improvements in Corsets, of which the following is a full, clear, and exact description, reference being had to the accompanying drawings, forming part of this specification.

My invention relates to corsets; and it consists in a corset provided with steels, bones, or equivalent stiffeners, each of which is curved longitudinally edgewise, seated or incorporated in correspondingly-curved pockets or folds, constituted by and in the material of the corset-body and extending in series along and from the top or bottom edge, or both, of said body substantially to and with their apices at the waist-line of the corset, and with the extremities of each of said curved steels terminating at one and the same edge of the said corset-body, substantially as hereinafter described, as and for the purpose specified.

I employ the term "curved longitudinally" herein to signify that each steel, bone, or equivalent stiffener has along or on its length a substantially gradual edgewise turn or reversal of direction, in consequence of which it extends, incorporated in correspondingly-shaped pockets in the corset-body, from an edge of the corset-body through said body, and returns to one and the same edge of said body.

Figure 1:
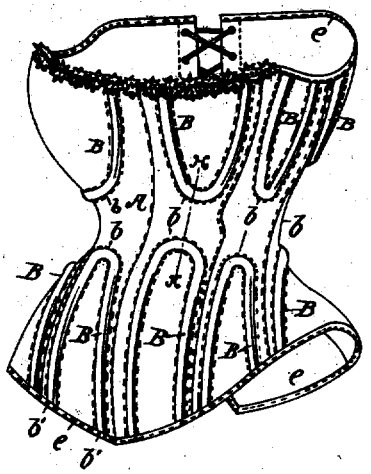
Figure 2:
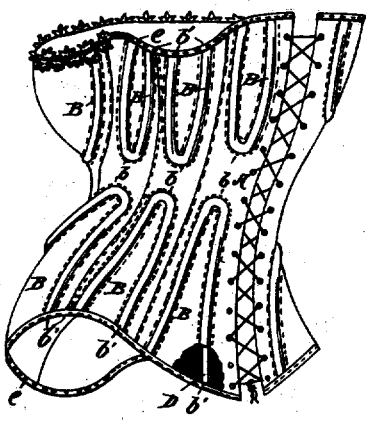
Figure 3:
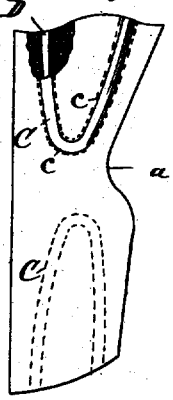
Figure 4:
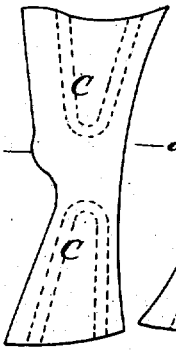
Figure 5:
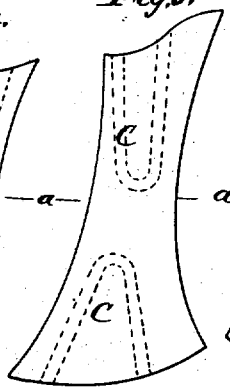
Figure 6:
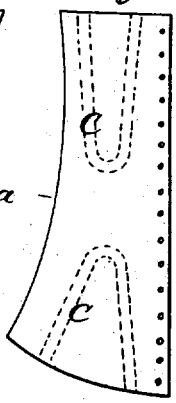
Figure 7:
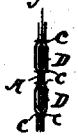
Figure 8:
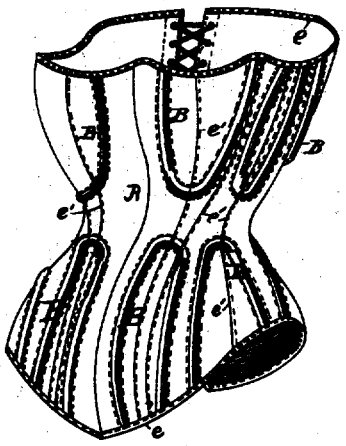
Figure 9:
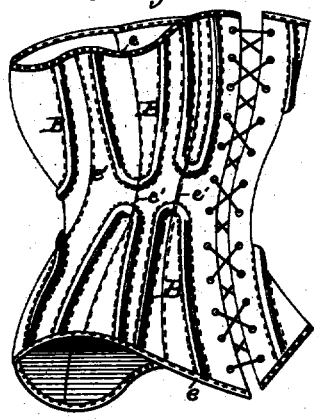
Figure 10:
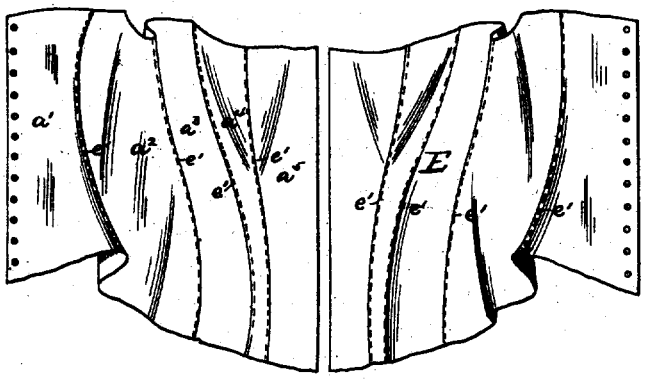
Figure 11:
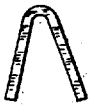

Figure 1 is a front view of a corset containing my invention. Fig. 2 is a side and partial rear view of a corset containing the invention. Figs. 3, 4, 5, and 6 show separated in outline and detail the several pieces or blanks which when joined at their edges constitute one side or half of the corset. Fig. 7 is a cross-section of the corset on the line *x x*, Fig. 1. Fig. 8 is a front view of a differently-constituted corset containing my invention. Fig. 9 is a side and partial rear view of the same; and Fig. 10 is a plan of the two blanks or thicknesses of cloth laid open and separate, and shown composed each of several pieces sewed together, the said blanks, when imposed flatwise on each other and secured at coincident edges, constituting one side or half of the corset shown in Figs. 9 and 10. Fig. 11 is a plan of a curved corset-steel, such as I employ in carrying out my invention.

In constructing a corset in accordance with my present invention I take strips of spring-steel, or bone, wood, or other suitable and equivalent stiffening material, which are bent or curved along or on their length edgewise—such, for example, as that shown in plan in Fig. 11—and I seat or incorporate the same in the corset-body in correspondingly-curved pockets or folds constituted in and by the material of the corset-body, and which inclose and cover the said stiffeners, and which are so formed and arranged that when the stiffeners are seated therein they extend in a series along and from the top or bottom edge (one or both) of said corset-body to the waist-line of the corset, and with their apices at or near said waist-line, and the extremities of each stiffener terminating at one and the same edge of the corset-body.

The corset-body is shown at A in Figs. 1 and 2, and the places where the edgewise-curved stiffeners are seated are indicated at B, the apices *b* of each being substantially at the waist-line of the corset-body, and the extremities *b'* of each terminating at one and the same edge of said body, as hereinbefore specified.

It is my intention, and it will be found desirable, to construct a corset with a series of these curved stiffeners extending toward the waist-line from both the top and bottom edges of the corset, as shown in the drawings, one being seated in the material of the corset-body around and under the breast-swells, one or two under the arm, and one in the back extending downwardly to the waist-line from the top edge of the corset, and several extending upwardly over the hip, front and rear, from the lower edge to the waist-line, with the adjacent apices of the members of each series located opposedly to each other on opposite sides of the waist-line. The number of curved stays constituting each series may be varied, and the location of the apices of the members of the series relatively to each other at the waist-line may be changed, so that such apices are located otherwise than opposedly without material variation from the essential features of my invention.

In constructing my improved corset I take the double thickness of cloth which constitutes each of the several pieces or blanks, Figs. 3, 4, 5, 6, of which one side or half of the corset is to be composed, and before these several blanks are sewed together at their adjacent edges *a*, I form a pocket, C, in each by placing rows of stitching in parallel lines and having a general curve to correspond to the shape or curve of the stiffeners to be inserted, said stitching passing through both thicknesses of the cloth and the lines of stitching extending from the end of the blank to a point at or about, but not beyond, the waist-line of the completed corset-body. Into each of these pockets I then pass a stiffener, as at D, or the stiffeners may be laid between the thicknesses of cloth, and then the rows of stitching, as at *c*, may be made along and just beyond the said edges of the curved stiffeners. The blanks thus formed may now be stitched together at their side edges, *a*, to constitute one-half the corset-body, and the top and bottom edges of such half may then be inclosed by a binding, *e*, which will cover the extremities of the stiffeners at the same time that it gives a finish to the corset.

Instead of stitching a pocket in each blank which enters into the construction of one-half the corset, the pockets may be formed and the stiffeners inserted, as shown in Figs. 8, 9, and 10. The single thicknesses of cloth-blanks (shown at $a'$, $a^2$, $a^3$, $a^4$, and $a^5$) may be sewed together at their side edges, thus constituting one thickness of the cloth which forms the half of the corset, and a similarly-constituted piece, E, may then be laid over and upon the first-described piece flatwise, with the margins or edges corresponding or coinciding, and then the pockets may be stitched through the double thicknesses thus formed, extending from the top or bottom edge, or both, to the waist-line, and adapted to receive and hold the curved stiffeners. By this means the stiffeners may be caused to run across the edge seams, $e'$, of the several pieces which constitute the one-half of the corset-body.

It would be inconvenient and costly, if not wholly impracticable, to sew the several blanks $a'$, $a^2$, $a^3$, $a^4$, and $a^5$ of double thickness together at their side edges by seams at $e'$ to constitute the half of the corset, leaving spaces or breaks in the seams at such places as are to be crossed by the inserted stiffeners. Where such seams are to be crossed by the stiffeners, the mode of construction described will be found expeditious and economical.

By means of my invention as described I am enabled to construct a corset in which bones or steels extending from top to bottom across the waist-line may be wholly dispensed with, the series of edgewise-curved stiffeners extending in the corset-body from the top and bottom edges, as described, to the waist-line, with their apices located opposedly at the waist-line, fully supporting and sustaining the form of the wearer and keeping the corset-body in shape, while at the same time the movement of body of the wearer at the waist is left entirely free, and the liability to fracture the bones or springs at the waist is entirely avoided.

I do not claim herein a corset provided with "re-enforcing strips" secured upon the outside of the corset-body and extending from the top or bottom edge of said body in more or less of a curve over and upon said body and toward, but not beyond, said waist-line of the corset, and with both extremities of said "strip" terminating at one and the same edge of said corset-body, as a corset thus constructed forms the subject-matter of an application for Letters Patent by me, Serial No. 165,789, filed May 18, 1885, in the United States Patent Office. My claim herein is for a different structure—namely, a corset provided with longitudinally edgewise-curved stiffeners or stays incorporated in the material of the corset-body itself, being seated and inclosed in correspondingly-curved pockets or folds constituted by the material of the corset-body, and extending in series along and from the top or bottom edge of said body upwardly or downwardly of said body, substantially to the waist-line, with the extremities of each stiffener terminating on one and the same edge of the corset-body.

What I claim as my invention, and desire to secure by Letters Patent, is—

A corset provided with longitudinally edgewise-curved stiffeners or stays incorporated and inclosed in correspondingly-curved pockets or folds, constituted in and by the material of the corset-body, and extending in a series along the top or bottom edges, or both, of the corset-body, through said body from said edges to substantially the waist-line of the corset, and with their apices located at said waist-line, and with both extremities of each said curved stiffeners or stays terminating at one and the same edge of the corset-body, substantially as and for the purpose set forth.

CATHARINE A. GRISWOLD.

Witnesses:
JOHN J. ENNIS,
WILLIAM LIPPIATT.